(No Model.)
H. E. TALLMAN.
APPARATUS FOR PHOTOGRAPHIC PRINTING.
No. 486,913. Patented Nov. 29, 1892.
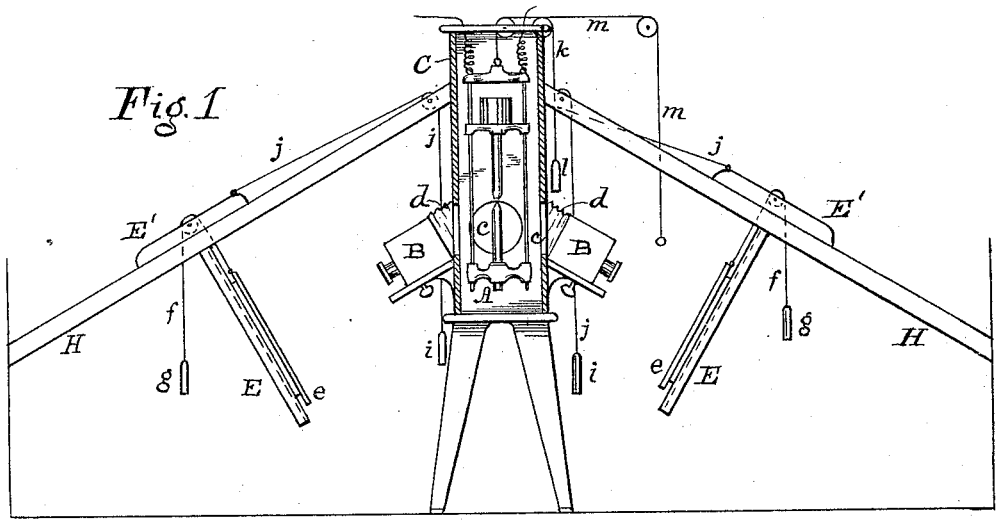
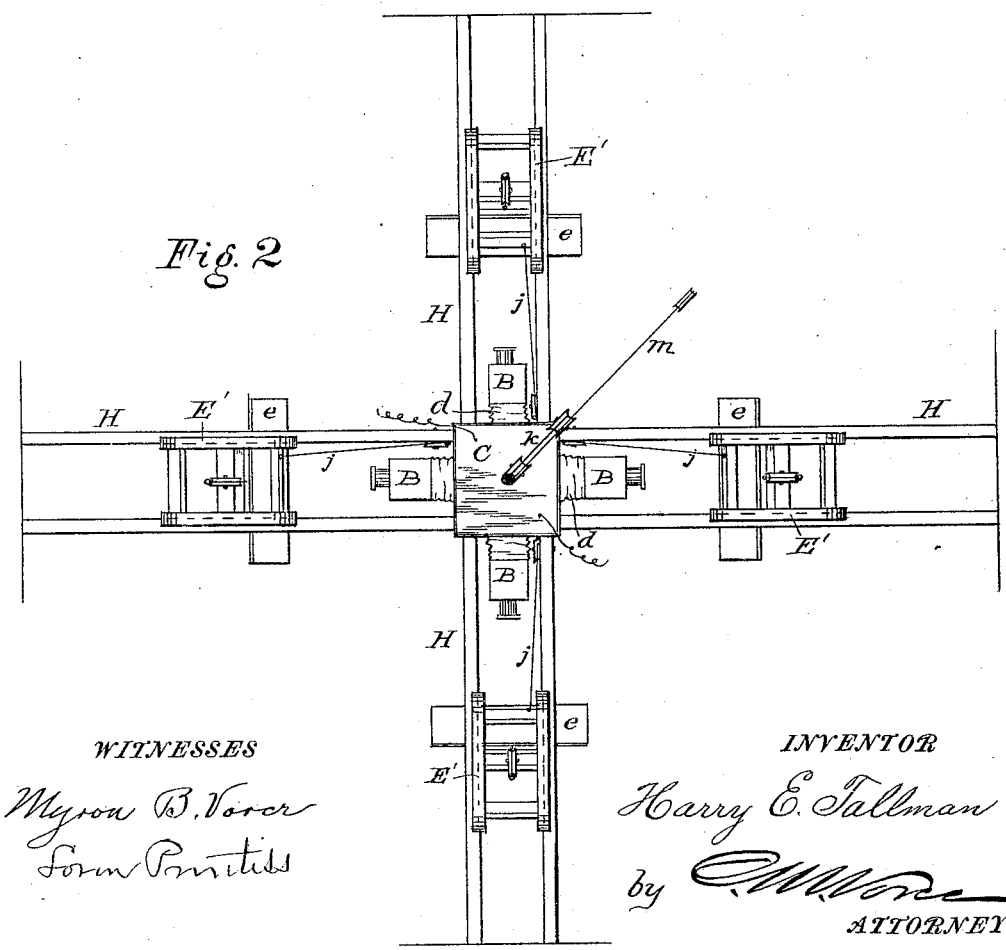

UNITED STATES PATENT OFFICE.

HARRY E. TALLMAN, OF CLEVELAND, OHIO.

APPARATUS FOR PHOTOGRAPHIC PRINTING.

SPECIFICATION forming part of Letters Patent No. 486,913, dated November 29, 1892.

Application filed December 1, 1890. Serial No. 373,267. (No model.)

*To all whom it may concern:*

Be it known that I, HARRY E. TALLMAN, a citizen of the United States, residing at Cleveland, in the county of Cuyahoga and State of Ohio, have invented certain new and useful Improvements in Apparatus for Photographic Printing; and I do hereby declare the following to be a full, clear, and exact description of the invention, such as will enable others skilled in the art to which it appertains to make and use the same.

My invention relates to improvements in apparatus for photographic printing by means of the electric-arc light, and has special reference to apparatus for enlarging, copying, &c., by means of the photographic camera.

The object of the invention is to enable a number of cameras to be operated simultaneously with a single light; and it consists in the detail of construction herein set forth and claimed.

Figure 1 is a side view, in elevation, of an apparatus arranged according to my invention. Fig. 2 is a plan view of the same.

I arrange the cameras equidistant about the lamp and so far therefrom that the focus of the condensing-lenses shall be within the posterior focus of the camera-lens system in order to evenly light the negative to be printed from. The cameras are upon the same level, but are inclined from the horizontal, as shown in Fig. 1. The amount of inclination required will vary slightly, according to the relative size of the carbons used in the lamp, but in general an inclination of thirty degrees to thirty-five degrees from the horizontal will be sufficient, and in case a lamp like the Werderman or other lamp having a positive carbon largely exceeding in dimension the negative carbon is used the inclination may be less. Each of the cameras may be completely inclosed to exclude all diffused or reflected light, but I prefer for convenience to inclose the electric lamp in a closed chamber having openings to which the cameras are connected by light-proof connections, so that no light escapes, except what passes through the camera-lenses, and to arrange the paper-holder upon a separate frame, as shown in Figs. 1 and 2, which frame need not be connected with the camera, but is rigidly secured in proper relation thereto. By this arrangement easy access to the paper-holding frames is obtained for changing and replacing paper and for examining and removing the prints.

To enable the operator to effect the necessary compensation between the condensers and camera-lenses to secure a clear and evenly-lighted field when required by the movement of the paper-holding frame to or from the camera to regulate the size of the print, the cameras B B B are made movable on their supports in their optical axes and are provided with some suitable clamping device to secure them in place when adjusted, for which purpose I prefer the binding-screw, such as is commonly used to fasten a camera to its tripod, and provide a slot in the bracket supporting the camera, through which the screw passes. By thus making the camera movable instead of the condensers the latter may be rigidly secured to the case surrounding the lamp and the negative-holding frame fixed in position, so as to require only the movement of the camera and paper-holding frame to effect all required adjustments.

Referring now to the drawings, A represents an electric-arc lamp.

B B B are ordinary photographic-printing cameras, each provided with the proper condensing-lenses, plate-holders, focusing-screw, and sliding box or bellows, as used in printing or copying cameras.

C is a case inclosing the arc lamp and suitably supported at a convenient height.

$c\ c$ are openings in the case C, opposite each of which openings one of the cameras B is supported at an inclination of about thirty-five degrees from the horizontal, and is connected to the case C by a light-tight connection, such as the hood $d$, which may be flexible or extensible.

E E are frames suitably supported at right angles to the axial line of the lens system of each camera and carrying an adjustable paper-holder $e$, sliding in suitable grooves in the frame E. A cord $f$, passing from the frame E over a pulley at the top of the frame E, carries a counterweight $g$, which balances the frame E and holds it at whatever elevation it is placed. The frame E is supported by slides E' upon grooved ways H, so as to slide easily and smoothly, and is counterpoised by a weight $i$, attached to a cord $j$, passing over a pulley and secured to the upper end of the frame E or to the slides E'. By pulling on the cord $j$ the operator draws the frame E nearer to the camera, and by lifting the weight $i$ or pushing the frame E the latter descends along the ways H by its own weight to the desired distance from the camera. The lamp A is counterpoised in a similar manner by means of a cord $k$ and weight $l$, and a cord $m$, attached to the lamp and passing by pulleys to any point within convenient reach of the operator, serves to raise or lower the lamp as the burning away of the carbons may render necessary. If preferred, the counterpoise $l$ may be attached to cord $m$ and the cord $k$ may be dispensed with. A suitable door is provided to the case C at any convenient point, by means of which access is had to the lamp for trimming or otherwise adjusting the same.

A focusing-lamp, such as is in well-known use, may be employed, if preferred, and in such case the counterpoise or other means of vertical adjustment of the lamp will not be required.

In place of suspending the frame E, carrying the paper-holder, from ways overhead, it could be supported upon ways placed beneath it; but I regard the overhead ways as more convenient and preferable in many respects.

What I claim as my invention, and desire to secure by Letters Patent, is—

1. The combination, in a photo-printing apparatus, of an electric arc-lamp adjustably supported in a light-proof case having openings therein, a series of cameras supported about said case with their optical axes inclined to the axes of the electrodes of said lamp and focally adjustable with relation thereto, each of said cameras being connected by a light-proof connection to one of the openings of said case, and a series of paper-holders, one opposite each of said cameras, supported upon guiding-ways in the optical axis of the camera and adjustable focally therein and transversely thereto, substantially as described.

2. The combination, in a photo-printing apparatus, of an electric arc-lamp adjustable vertically, a light-proof case inclosing said lamp and having a series of openings in its sides, a series of cameras secured to said case with their optical axes inclined to the axial line of the electrodes of said lamp, each of said cameras being connected by a light-proof connection to one of the openings in said case and being adjustable in its optical axis, guiding-ways arranged opposite each of said cameras and carrying a frame traversing in the optical axis of the camera, and paper-holders supported upon such frames and adjustable transversely to the optical axis of the camera, all combined and operating substantially as described.

In testimony whereof I hereto affix my signature in presence of two witnesses.

HARRY E. TALLMAN.

Witnesses:
L. D. TALLMAN,
L. PRENTISS.